(12) United States Patent
Rajasekar

(10) Patent No.: US 11,023,255 B2
(45) Date of Patent: Jun. 1, 2021

(54) DECLARATIVE TECHNICAL CONFIGURATION COMPOSER FOR INTEGRATION SETUP

(71) Applicant: SAP SE, Walldorf (DE)

(72) Inventor: Manikandan Rajasekar, Chennai (IN)

(73) Assignee: SAP SE, Walldorf (DE)

( * ) Notice: Subject to any disclaimer, the term of this patent is extended or adjusted under 35 U.S.C. 154(b) by 256 days.

(21) Appl. No.: 16/199,424

(22) Filed: Nov. 26, 2018

(65) Prior Publication Data

US 2020/0167172 A1     May 28, 2020

(51) Int. Cl.
  *G06F 9/445*     (2018.01)
  *G06F 9/50*      (2006.01)
  *G06F 9/54*      (2006.01)

(52) U.S. Cl.
  CPC ........ *G06F 9/44505* (2013.01); *G06F 9/5038* (2013.01); *G06F 9/541* (2013.01)

(58) Field of Classification Search
  CPC .................................................. G06F 9/44505
  See application file for complete search history.

(56) References Cited

U.S. PATENT DOCUMENTS

| 5,748,980 A * | 5/1998 | Lipe ...................... G06F 9/4411 710/104 |
| 9,985,845 B2 | 5/2018 | Rajasekar et al. |
| 2005/0010822 A1* | 1/2005 | Zhou .................. H04L 63/0263 726/4 |

* cited by examiner

*Primary Examiner* — Kim Huynh
*Assistant Examiner* — Eric Chang
(74) *Attorney, Agent, or Firm* — Fish & Richardson P.C.

(57) ABSTRACT

Methods, systems, and computer-readable storage media for receiving a configuration descriptor from configuration descriptor repository, the configuration descriptor declaring a configuration task, and providing an order of invoking two or more application programming interfaces (APIs) to respective components of the enterprise-side landscape to execute the configuration task, processing the configuration descriptor by a configuration executor of an integration services platform to automatically execute at least a portion of the configuration task by invoking the two or more APIs in the order, a response of a first API being provided as a request to a second API, and selectively indicating one of success and failure of the configuration task based on at least one response of the two or more APIs.

20 Claims, 5 Drawing Sheets

```
version: "cias 2.0"
name: "create_user_assign_role"
description: "Create user and assign
role"
path: "../rest/"
role: "administrator"
auth: "basic"

apis:
- type: "REST"

request:
  -mime: "application/json"

response:
  -mime: "application/json"

sequence:
  -condition: flow_order
  -order: [url1,url2,url3,url4,url5]

parameters:
  -input:
   id: "userid"
   type: string id: "roleid"
   type: string -output:
    id: "status"
    type: string -reference:
     id: "xsrftoeken1"
     type: request_header APIs:

url: "landscape/V1/User/check"
  id: "url1"
  method: POST
  request:
    - form: { user = @.in.userid}
  response:
    - data: {@.api1.status= $.status}
  error:
    400: auth error
    500: internal server error
```

FIG. 3

```
url: "secure/v1/Token/getToken"
id: "url2"
method: GET
response:
 -header: {@.api2.toekn = $.XSRF-XX-
   TOEKN}
error:
   400: auth error
   500: internal server error url: "landscape/V1/User/create"
id: "url3"
method: POST
request:
  - form: { userc= @.in.userid}
  - header: {XSRF-XX_TOKEN =
    @.api2.token}
response:
  - data: {@@.api3.status = $.status}
error:
   400: auth error
   500: internal server error url: "landscape/V1/User/activate"
id: "url4"
method: POST
request:
  - form: { user=@.in.userid}
  - header: {XSRF-XX_TOKEN =
    @.api2.token}
response:
  - data: {@api4.status = $.status}
error:
   400: auth error
   500: internal server error url: "landscape/V1/User/assignRole"
id: "url5"
method: POST
request:
  - form: { user=@.in.userid , role =
    @.in.roleid}
  - header: {XSRF-XX_TOKEN =
    @.api2.token}
response:
  - data: {@.api5.status = $.status}
error:
   400: auth error
   500: internal server error
```

DECLARATIVE TECHNICAL CONFIGURATION COMPOSER FOR INTEGRATION SETUP

BACKGROUND

Enterprises leverage vendor-provided systems to provide functionality for their day-to-day operations. In some examples, vendors provide cloud-based software systems that enterprises can integrate their operations with. For example, a vendor can provide a cloud-based human resources management platform that is integrated with systems of the enterprise to enable the enterprise to leverage functionality of the human resources management platform. Integration is a time-consuming, and resource-intensive task that can include technical configurations, process configurations, and provisioning procedures between the cloud-based platform, and a landscape of the enterprise.

SUMMARY

Implementations of the present disclosure are directed to integrating enterprise systems with vendor-provided systems. More particularly, implementations of the present disclosure are directed to a declarative technical configuration approach for integrating enterprise systems with vendor-provided systems.

In some implementations, actions include receiving a configuration descriptor from configuration descriptor repository, the configuration descriptor declaring a configuration task, and providing an order of invoking two or more application programming interfaces (APIs) to respective components of the enterprise-side landscape to execute the configuration task, processing the configuration descriptor by a configuration executor of an integration services platform to automatically execute at least a portion of the configuration task by invoking the two or more APIs in the order, a response of a first API being provided as a request to a second API, and selectively indicating one of success and failure of the configuration task based on at least one response of the two or more APIs. Other implementations of this aspect include corresponding systems, apparatus, and computer programs, configured to perform the actions of the methods, encoded on computer storage devices.

These and other implementations can each optionally include one or more of the following features: the configuration descriptor defines parameters for APIs; for each API of the two or more APIs, the configuration descriptor provides one or more of an address of the API, an identified assigned to the API, and a method type of the API; parameters are used for invocation of at least one API of the two or more APIs; each parameter is of a type including only one of input, output, reference; the configuration descriptor defines, for each API of the two or more APIs, a request format, and an expected response format; and the configuration descriptor defines a global type of API for the two or more APIs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts example pseudo-code of a configuration descriptor for an example use case in accordance with implementations of the present disclosure.

Like reference symbols in the various drawings indicate like elements.

DETAILED DESCRIPTION

Figure 1:
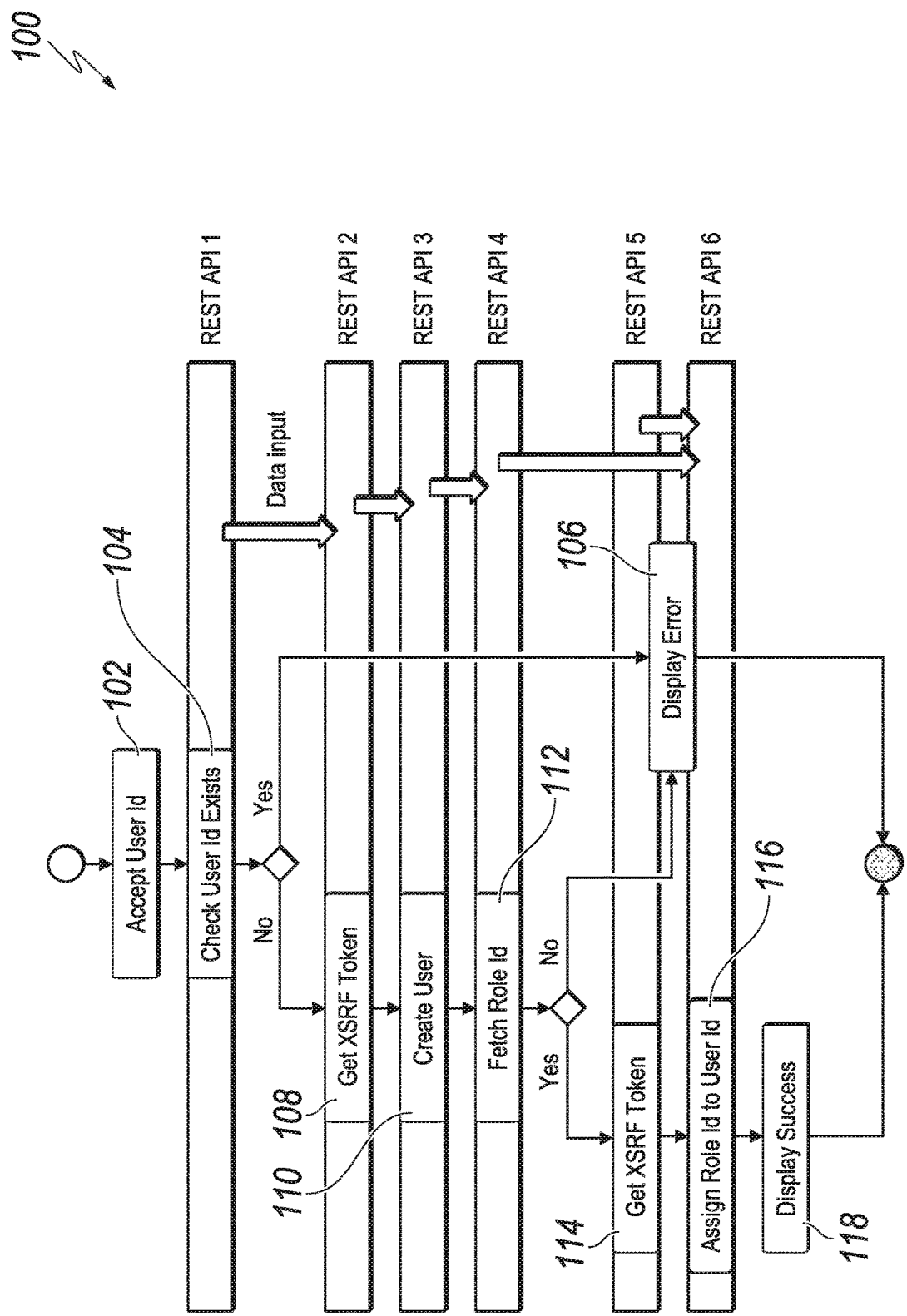
FIG. 1 depicts an example process in accordance with an example configuration task.

Implementations of the present disclosure are directed to integrating enterprise systems with vendor-provided systems. More particularly, implementations of the present disclosure are directed to a declarative technical configuration approach for integrating enterprise systems with vendor-provided systems. Implementations can include actions of receiving a configuration descriptor from configuration descriptor repository, the configuration descriptor declaring a configuration task, and providing an order of invoking two or more application programming interfaces (APIs) to respective components of the enterprise-side landscape to execute the configuration task, processing the configuration descriptor by a configuration executor of an integration services platform to automatically execute at least a portion of the configuration task by invoking the two or more APIs in the order, a response of a first API being provided as a request to a second API, and selectively indicating one of success and failure of the configuration task based on at least one response of the two or more APIs.

To provide further context for implementations of the present disclosure, and as introduced above, enterprises leverage vendor-provided systems to provide functionality for their day-to-day operations. In some examples, vendors provide cloud-based software systems that enterprises can integrate their operations with. For example, a vendor can provide a cloud-based human resources management platform (e.g., SAP Success Factors Employee Central provided by SAP SE of Walldorf, Germany) that is integrated with systems of the enterprise to enable the enterprise to leverage functionality of the human resources management platform. Integration is a time-consuming, and resource-intensive task that can include technical configurations, process configurations, and provisioning procedures between the cloud-based platform, and a landscape of the enterprise.

Integration services can be provided to assist in the integration process. An example integration service includes the Cloud Integration Automation Service (CIAS) provided by SAP SE. Implementations of the present disclosure are described in further detail with reference to CIAS provided by SAP SE. It is contemplated, however, that implementations of the present disclosure can be realized with any appropriate integration service.

In general, integration services, such as CIAS, assist enterprises in setting-up the integration between enterprise systems (e.g., an enterprise landscape), and one or more cloud-based platforms provided by a vendor (e.g., vendor-provided systems). With non-limiting reference to SAP SE, an example integration can include integration between a SAP S/4HANA System to SAP Success Factors Employee Central to realize an example integration scenario (e.g., new hire). The CIAS simplifies, and optimizes the time required to setup the configuration between landscape components (e.g., systems within landscapes).

In CIAS, the technical configuration, business configuration, and provisioning procedure related to integration setup between landscape components are provided as guided workflows for one or more users. The detailed information about configuration steps and provisioning procedure are store in a repository within CIAS, which contains the textual description of the procedure. During execution in runtime, this textual information is transformed into workflow tasks. In some examples, an integration scenario may contain numerous configuration tasks, which can span across multiple systems. Setup activities among different systems can include manual tasks that are to be executed by administrators. For example, an integration scenario can include multiple configuration tasks, each configuration task being performed by a particular role (e.g., administrator), and a respective system.

With regard to automation, the CIAS seeks to optimize the configurations using automation techniques available from respective systems. In automation scenarios, the target systems (e.g., landscape components of the enterprise) provide application programming interfaces (APIs) that can be described as being at a micro-logic level (e.g., (atomic operations. Writing the automation equivalent of a configuration tasks always leads to a combination of multiple APIs executing together in sequence. In some examples, the automation related information is programmed into a file (e.g., in CIAS, a Configuration Object APIs Invocation Caller (COAIC)). In some examples, the file is provided as an implementation class. The automation program combines the APIs to achieve configuration task automation. However, programming such files is a resource-intensive effort, requiring developer experience, expert knowledge, and deep knowledge of the particular integration service (e.g., CIAS).

In some instances, an execution engine is provided to execute the files for automated configuration tasks to be performed. For example, the CIAS includes an automation executor engine that compiles the COAIC files for each product delivery. A configuration executor within the CIAS runtime executes the COAIC files based on the current instance of the configuration task(s) using the destination to target systems. The configuration executor loads the COAIC files, and results are stored as execution logs. For each configuration task automation scope, the COAIC files need to be programmed manually, and compiled to the CIAS runtime component before delivery. The COAIC files vary depending on the configuration task, system API formats, and the like.

FIG. 1 depicts a non-limiting example use case. The non-limiting example use case of FIG. 1 includes an example configuration task for creating a user having a role assigned thereto. The example configuration task is among numerous configuration tasks that are to be performed in an integration scenario. FIG. 1 depicts an example process 100 for the configuration task to create a user having a role assigned thereto, specifically, the creation of "User" with the role "entity.reader."

In the example of FIG. 1, the User Id is accepted from an end user (102), and a check is performed as to whether the User Id already exists in target system (104). If the User Id already exists, an error is output (106). If the User Id does not already exist, a token is generated (108). For example, a XSRF token. The user is created using the User Id (110), and the role that is to be assigned to the user is fetched using a Role Id (112). The User Id is activated with an initial password. It is determined whether the Role Id exists. If the Role Id does not exist, an error is output (106). If the Role Id does exist, the token is retrieved (114), the user is created by assigning role (e.g., entity.reader) to the User Id (116), and a success indicator is output (118). As depicted in FIG. 1, the example process 100 is executed based on a sequence of API calls (e.g., calls to REST APIs 1, . . . , 6).

In view of potential errors and exceptional use cases at each level of API invocation, the flow logic is more complex during runtime. Generally, and as introduced above, the landscape components implement micrologic-based REST APIs to perform each step individually. In view of the example use case, example APIs are provided below in Table 1:

TABLE 1

Example Use Case Activities and APIs

| Logical Activity | HTTP Method | API Endpoint |
|---|---|---|
| Check User Id Exists | POST | . . ./rest/landscape/V1/User/check |
| Create User Id | POST | . . ./rest/landscape/V1/User/create |
| Activate User Id | POST | . . ./rest/landscape/V1/User/activate |
| Get Role Id | GET | . . ./rest/landscape/V1/Roles/getRole |
| Assign Role | POST | . . ./rest/landscape/V1/User/assignRole |
| Get Token | GET | . . ./rest/landscape/V1/Token/getToken |

To execute the example use case, and as introduced above, a COAIC file needs to be developed, compiled, and delivered. During runtime, the automation engine invokes the target APIs in the defined sequence. In this manner, the micrologic of the respective APIs is combined to perform the configuration task. However, appropriately combining the micrologic requires deep knowledge (e.g., which APIs provide what micrologic, order of combining micrologic to achieved configuration task), API invocation knowledge (e.g., API endpoints, invocation methods), as well as deep knowledge in testability, and the CIAS technology domain.

Further, the implementation and maintenance of COAIC files within the CIAS framework is also resource intensive. For example, the COAIC files need to be adapted based on landscape component version, depreciation strategy, and new version strategy. These activities increase the onboarding activity for any new integration scenario. Still there is a requirement to call all the micrologic-based APIs together for a single configuration object as a seamless execution in a single configuration task with less effort.

In view of the above context, implementations of the present disclosure provide for automation enablement in integration services. More particularly, implementations of the present disclosure provide a declarative technical configuration approach for integrating enterprise systems with vendor-provided systems. As described in further detail herein, implementations of the present disclosure enable resource-efficient composition of APIs to provide automated configuration activities in integration scenarios.

In accordance with the declarative configuration approach of the present disclosure, instead of writing a file (e.g., COAIC) for each and every configuration task in a integration scenario, the users of the integration service (e.g., CIAS) declare the APIs and their sequence, parameter exchange in a configuration descriptor filed (e.g., a JSON file—*.cias.config.descriptor). During runtime, the configuration executor in the integration service runtime component connects to a generic adapter to load the descriptor file. Based on the declarations in the descriptor file, APIs will be executed by the integration service runtime. The integration service runtime stores the results into execution logs. In some implementations, a configuration descriptor editor (e.g., based on REST specification) is provided, and can be used to both create the configuration descriptor file, and testing the APIs.

Figure 2:
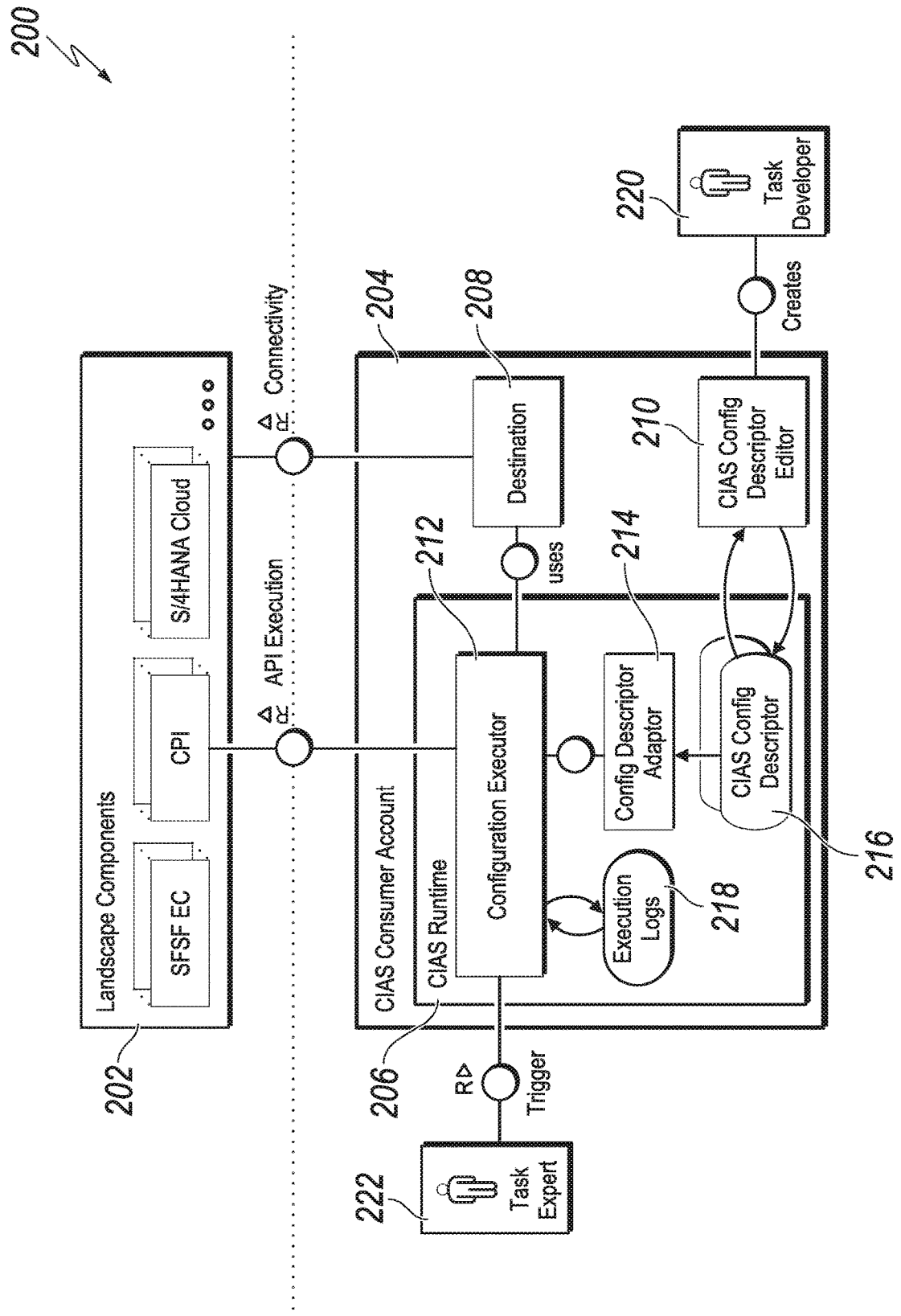
FIG. 2 depicts an example architecture that can be used to execute implementations of the present disclosure.

FIG. 2 depicts an example architecture 200 in accordance with implementations of the present disclosure. In the depicted example, the example architecture 200 includes a landscape 202, and an integration services platform 204. The landscape 202 can include an enterprise-side landscape having multiple components, one or more of which are to be configured in an integration scenario. For example, one or more configuration tasks are performed in the integration scenario that impact one or more components of the landscape 202. In some implementations, the integration services platform 204 is provided to execute configuration tasks impacting the landscape 202. In some examples, the integration services platform 204 can be provided as a CIAS platform introduced above.

In the example of FIG. 2, the integration services platform 204 includes an integration services runtime 206, a destination module 208, and a configuration descriptor editor 210. The integration services runtime 206 includes a configuration executor 212, a configuration descriptor adapter 214, a configuration descriptor store 216, and an execution logs store 218. In accordance with implementations of the present disclosure, a user 220 (e.g., a configuration task developer) uses the configuration descriptor editor to create one or more configuration descriptor files, which are stored in in the configuration descriptor store 216. As described herein, each configuration descriptor can be processed by the integration services runtime 206 to execute a configuration task on the landscape 202.

In some implementations, a user 222 (e.g., a task expert) can trigger the integration services runtime 206 to execute a configuration task using a configuration descriptor of the configuration descriptor store 216. For example, the user 222 can trigger execution of the example configuration task to create a user having a role assigned thereto, introduced above. In some implementations, the configuration executor 212 receives the respective configuration descriptor from the configuration descriptor store 216 through the configuration descriptor adapter 214. The configuration executor 212 processes the configuration descriptor to perform the configuration task on one or more components of the landscape through invocation of respective APIs, as described herein.

In some examples, the destination module 208 is an agent that has a repository to store the connectivity related properties of various systems in the customer landscape, and can include interfaces to read specific properties. Example information includes, without limitation, connectivity URL, authentication, end point base path, and proxy host data of a system in customer landscape. The configuration executor 212 uses the properties of a specific system to connect and invoke the respective APIs as described in the declaration file.

In accordance with implementations of the present disclosure, the declaration provided through the configuration descriptor follows a model that is specific to the particular integration services platform (e.g., CIAS-specific model), and aligns with API specifications (e.g., the open API specification). The declaration semantics cover the following example aspects: path to the APIs, method type of each API, API type, parameters, required roles (if any) for API execution, request structure, authentication types, response structure, request headers handling, response header handling, exchange of parameters across APIs, and sequence and condition of API invocation.

In some examples, relative paths to the APIs are described in the configuration descriptor. This can be a global value for the complete configuration descriptor, or it can be specific to a respective API. In some examples, the method type of the API specifies the method type of the API like GET, POST, DELETE, PUT (e.g., HTTP method types) for each API, or GLOBAL for the entire configuration descriptor. In some examples, the API type indicates whether a respective API is a REST or an oData API.

In some examples, parameters specify the overall parameters involved in the respective configuration task. In some examples, the parameters can be used in URLs, response structure, request structure, and the like. The parameters can be provided in respective sub-types, which can include, without limitation, IN—input to the configuration task, OUT—expected response from the configuration task, and REFERENCE—used with the declaration for parameter exchange between API calls. In some examples, parameters are specified using the @ symbol followed by scope. For example, @.IN.<parameter name>, @.OUT.<parameter name>.

In some examples, required roles for API execution provide the target system specific roles required for executing the APIs, if any. In some examples, the request structure is provided as a MIME type, request structure to be used for POST-related calls. Parameters can be referenced in the request structures. In some examples, authentication types indicate the authentication type (e.g., basic, oAuth2) to be used for respective API execution. In some examples, response structure defines the expected response structure format and assignment of values to a parameter along with MIME type (e.g., $—specifies the response object).

In some examples, the request headers handling provides specific header information to be used in a REST API invocation request state. In some examples, the response header handling provides specific header information to be used in a REST API invocation response state. In some examples, exchange of parameters across APIs provides for parameter exchange between APIs (e.g., a response from an API into a request of another API). In some examples, the sequence and condition of API invocation defines a sequence/order, and conditional order in which the APIs are to be invoked on target systems (e.g., components of the landscape 202 of FIG. 2).

FIG. 3 depicts example pseudo-code 300 of a configuration descriptor for an example use case in accordance with implementations of the present disclosure. The example pseudo-code 300 of FIG. 3 can be provided in a configuration descriptor that can be processed by a configuration executor (e.g., the configuration executor 212 of FIG. 2) to create user with a specific role in landscape component (e.g., a component of the landscape 202 of FIG. 2).

Figure 4:
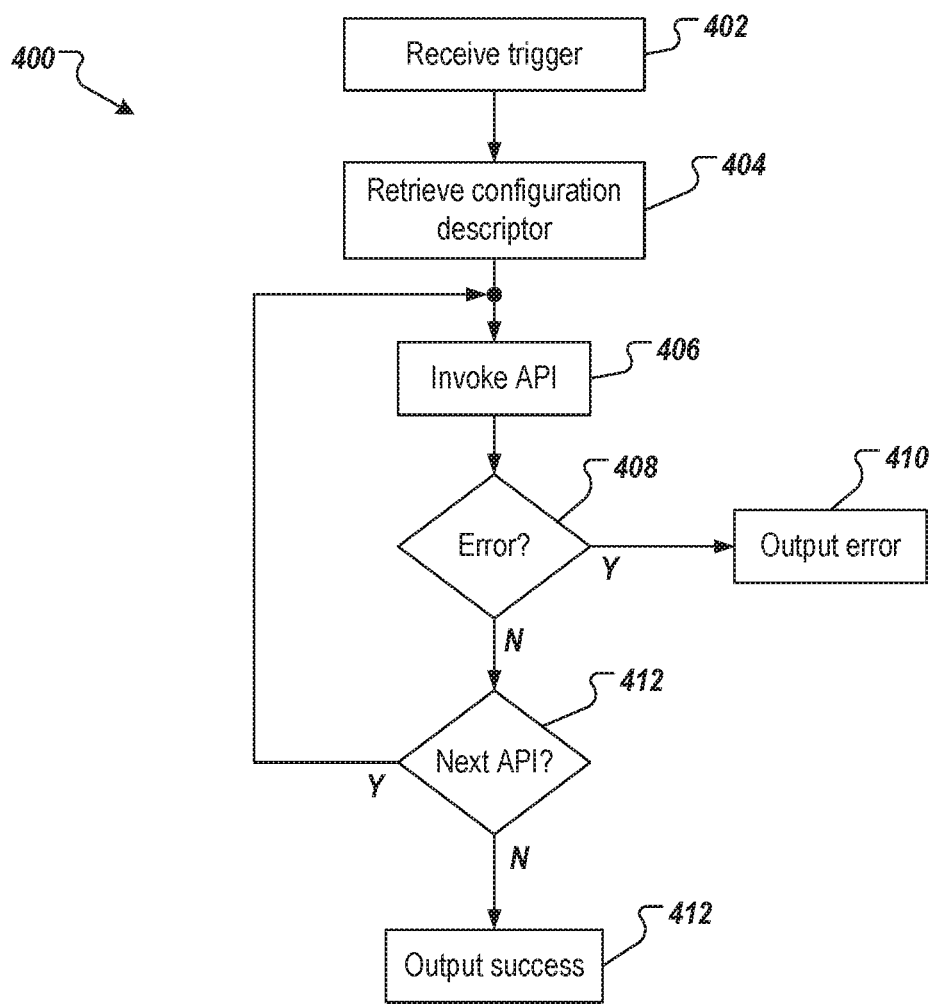
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. For example, the example process 400 can be executed by an IRFT of the present disclosure.

A trigger is received (402). For example, the user 222 triggers execution of one or more configuration tasks by providing input to the integration service runtime 206 of FIG. 2. In some examples, the input indicates an identifier of a configuration task that is to be executed (e.g., create_user_assign_role). A configuration descriptor is retrieved (404). For example, the configuration executor 212 retrieves the configuration descriptor from the configuration descriptor store 216 through the configuration descriptor adapter 214. In some examples, the configuration descriptor is retrieved based on the identifier (e.g., the configuration descriptor of the pseudo-code 300 of FIG. 3 is returned based on the identifier indicating create_user_assign_role).

An API is invoked (406). For example, the configuration executor 212 invokes an API based on an order of APIs provided in the configuration descriptor. In the example of FIG. 3, the order of APIs is provided as url1, url2, url3, url4, url5 (e.g., addresses (uniform resource locators (URLs)) of respective APIs 1, . . . , 5). It is determined whether an error occurred (408). For example, it is determined whether a request from the invoked API is in the expected format, and/or type. If an error occurred, an error is output (410), and the configuration task ends. For example, an error is displayed to the user 222.

It is determined whether another API is to be invoked (412). For example, after an API has been invoked, and is determined to be successful, it is determined whether another API in the order is to be invoked (e.g., after API2 (url2), API2 (url3) is invoked). If another API is to be invoked, the example process 400 loops back to invoke the next API (406). If no other API is to be invoked, success is output (412). For example, a success of the configuration task is displayed to the user 222.

Figure 5:
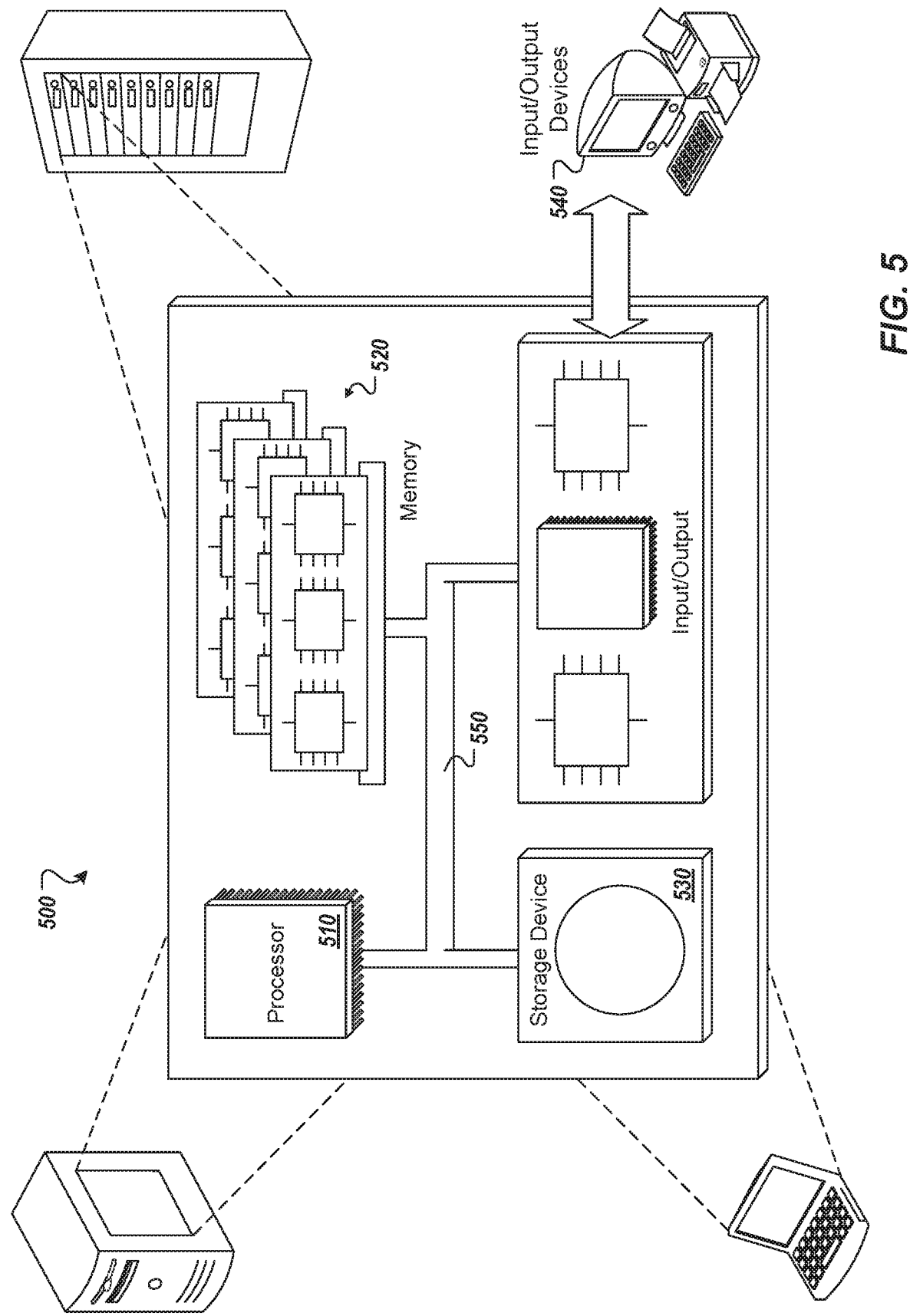
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for executing configuration tasks in an integration scenario between an enterprise-side landscape and a vendor-provided cloud platform, the method being executed by one or more processors and comprising:
   receiving, by configuration executor of a cloud integration service, a trigger comprising a configuration task identifier;
   receiving, through a configuration adapter of the cloud integration service, a configuration descriptor from a configuration descriptor repository based on the configuration task identifier, the configuration descriptor declaring a configuration task, and providing an order of invoking two or more application programming interfaces (APIs) to respective components of the enterprise-side landscape to execute the configuration task;
   processing the configuration descriptor by the configuration executor to automatically execute at least a portion of the configuration task by invoking the two or more APIs in the order, a response of a first API being provided as a request to a second API; and
   selectively indicating one of success and failure of the configuration task based on at least one response of the two or more APIs.

2. The method of claim 1, wherein the configuration descriptor defines parameters for APIs.

3. The method of claim 1, wherein, for each API of the two or more APIs, the configuration descriptor provides one or more of an address of the API, an identifier assigned to the API, and a method type of the API.

4. The method of claim 1, wherein parameters for invocation of at least one API of the two or more APIs.

5. The method of claim 4, wherein each parameter is of a type including only one of input, output, reference.

6. The method of claim 1, wherein the configuration descriptor defines, for each API of the two or more APIs, a request format, and an expected response format.

7. The method of claim 1, wherein the configuration descriptor defines a global type of API for the two or more APIs.

8. A non-transitory computer-readable storage medium coupled to one or more processors and having instructions stored thereon which, when executed by the one or more processors, cause the one or more processors to perform operations for executing configuration tasks in an integration scenario between an enterprise-side landscape and a vendor-provided cloud platform, the operations comprising:
   receiving, by configuration executor of a cloud integration service, a trigger comprising a configuration task identifier;
   receiving, through a configuration adapter of the cloud integration service, a configuration descriptor from a configuration descriptor repository based on the configuration task identifier, the configuration descriptor declaring a configuration task, and providing an order of invoking two or more application programming interfaces (APIs) to respective components of the enterprise-side landscape to execute the configuration task;
   processing the configuration descriptor by the configuration executor to automatically execute at least a portion of the configuration task by invoking the two or more APIs in the order, a response of a first API being provided as a request to a second API; and
   selectively indicating one of success and failure of the configuration task based on at least one response of the two or more APIs.

9. The computer-readable storage medium of claim 8, wherein the configuration descriptor defines parameters for APIs.

10. The computer-readable storage medium of claim 8, wherein, for each API of the two or more APIs, the configuration descriptor provides one or more of an address of the API, an identifier assigned to the API, and a method type of the API.

11. The computer-readable storage medium of claim 8, wherein parameters for invocation of at least one API of the two or more APIs.

12. The computer-readable storage medium of claim 11, wherein each parameter is of a type including only one of input, output, reference.

13. The computer-readable storage medium of claim 8, wherein the configuration descriptor defines, for each API of the two or more APIs, a request format, and an expected response format.

14. The computer-readable storage medium of claim 8, wherein the configuration descriptor defines a global type of API for the two or more APIs.

15. A system, comprising:
   a computing device; and
   a computer-readable storage device coupled to the computing device and having instructions stored thereon which, when executed by the computing device, cause the computing device to perform operations for executing configuration tasks in an integration scenario between an enterprise-side landscape and a vendor-provided cloud platform, the operations comprising:
      receiving, by configuration executor of a cloud integration service, a trigger comprising a configuration task identifier;
      receiving, through a configuration adapter of the cloud integration service, a configuration descriptor from a configuration descriptor repository based on the configuration task identifier, the configuration descriptor declaring a configuration task, and providing an order of invoking two or more application programming interfaces (APIs) to respective components of the enterprise-side landscape to execute the configuration task;

processing the configuration descriptor by the configuration executor to automatically execute at least a portion of the configuration task by invoking the two or more APIs in the order, a response of a first API being provided as a request to a second API; and selectively indicating one of success and failure of the configuration task based on at least one response of the two or more APIs.

16. The system of claim 15, wherein the configuration descriptor defines parameters for APIs.

17. The system of claim 15, wherein, for each API of the two or more APIs, the configuration descriptor provides one or more of an address of the API, an identified identifier assigned to the API, and a method type of the API.

18. The system of claim 15, wherein parameters for invocation of at least one API of the two or more APIs.

19. The system of claim 18, wherein each parameter is of a type including only one of input, output, reference.

20. The system of claim 15, wherein the configuration descriptor defines, for each API of the two or more APIs, a request format, and an expected response format.

* * * * *